ically for motor vehicles, which so clamps a catalyst body in an exhaust line that it is protected against exhaust gas oscillations and/or vehicle vibrations; the mounting of the catalyst body inside the exhaust line being elastic in both the radial and axial directions.

United States Patent [19]
Stute

[11] 3,992,157
[45] Nov. 16, 1976

[54] EXHAUST GAS CATALYST MOUNTING

[75] Inventor: Manfred Stute, Esslingen, Germany

[73] Assignee: Daimler-Benz Aktiengesellschaft, Stuttgart, Germany

[22] Filed: Apr. 10, 1974

[21] Appl. No.: 459,797

[30] Foreign Application Priority Data
Apr. 11, 1973  Germany............................ 2318126

[52] U.S. Cl............................... 23/288 FC; 60/299
[51] Int. Cl.².................... B01J 8/02; B01J 35/04; F01N 3/15
[58] Field of Search ........... 23/288 FC; 60/299, 301

[56]  References Cited
UNITED STATES PATENTS

| | | | |
|---|---|---|---|
| 1,595,711 | 8/1926 | Cornelier................. | 23/288 FC UX |
| 1,793,813 | 2/1931 | Mackinnon.............. | 23/288 FC UX |
| 3,248,188 | 4/1966 | Chute...................... | 23/288 FC UX |
| 3,441,382 | 4/1969 | Keith et al. ..................... | 23/288 FC |
| 3,641,763 | 2/1972 | Cole............................ | 23/288 FC X |
| 3,771,967 | 11/1973 | Nowak........................... | 23/288 FC |
| 3,798,006 | 4/1974 | Balluff ........................... | 23/288 FC |
| 3,801,289 | 2/1974 | Wiley............................. | 23/288 FC |
| 3,817,714 | 6/1974 | Wiley............................. | 23/288 FC |
| 3,841,842 | 10/1974 | Wiley............................. | 23/288 FC |
| 3,852,042 | 12/1974 | Wagner.......................... | 23/288 FC |

Primary Examiner—Morris O. Wolk
Assistant Examiner—Michael S. Marcus
Attorney, Agent, or Firm—Craig & Antonelli

[57]  ABSTRACT

An exhaust gas catalyst mounting, especially for motor vehicles, which so clamps a catalyst body in an exhaust line that it is protected against exhaust gas oscillations and/or vehicle vibrations; the mounting of the catalyst body inside the exhaust line being elastic in both the radial and axial directions.

3 Claims, 3 Drawing Figures

EXHAUST GAS CATALYST MOUNTING

The present invention relates to an exhaust gas catalyst mounting, especially for motor vehicles, which so clamps a catalyst body in an exhaust line that it is far-reachingly protected against exhaust gas oscillations and/or vehicle vibrations.

A known mounting is constructed as tubularly shaped part, into which the catalyst body is inserted under interposition of a wire mesh. The catalyst body consisting of ceramic material is clampingly held in that two disks of steel are pressed laterally against the same and are inwardly welded together with the tubularly shaped part. As a result of operationally conditioned warm-ups, the tubularly shaped member expands more strongly than the ceramic body of the catalyst. The play or clearance resulting therefrom between the catalyst body and the disks leads to the fact that the exhaust gas oscillations which occur in rapid sequence cause the two parts to strike or impinge against one another, whence they become unusable within a relatively short period of time.

The present invention is concerned with the task to provide in a simple manner a mounting which far-reachingly avoids the described difficulties.

The underlying problems are solved according to the present invention in that a mounting is installed into an exhaust line which elastically supports the catalyst body in the radial and in the axial direction. The advantage of such a mounting essentially consists in that the catalyst body is elastically clamped in within the exhaust line whence it is able to carry out a limited radial and/or axial movement and is able to absorb thereby exhaust gas oscillations and/or vehicle vibrations.

In one advantageous embodiment of the present invention, the radially elastic support takes place by a heat-resistant insulating material, for example, ceramic wool of conventional type, which fills out the space between the catalyst body and the exhaust line. The catalyst body is thereby simultaneously centered radially and is protected against a contact with the exhaust line.

The present invention additionally consists in that the axially elastic support takes place by two prestressed ring-shaped members or means which are arranged laterally at the gas inlet and gas outlet of the catalyst body and thereby permit an axially limited movement of the catalyst body.

A further favorable embodiment of the present invention results in that the two aforementioned ring-shaped members or means consist of individual parts which overlap scale-like.

Accordingly, it is an object of the present invention to provide an exhaust gas catalyst mounting which avoids by simple means the aforementioned shortcomings and drawbacks encountered in the prior art.

Another object of the present invention resides in an exhaust gas catalyst mounting which assures long length of life of the various parts.

A further object of the present invention resides in a mounting for an exhaust gas catalyst which is simple in construction, yet effectively eliminates the problems otherwise occurring due to the existing exhaust gas oscillations and vehicle vibrations.

A still further object of the present invention resides in an exhaust gas catalyst mounting which assures an elastic retention of the catalyst in the exhaust line, thereby enabling an absorption of exhaust gas oscillations and/or vehicle vibrations in both the axial and radial direction.

Another object of the present invention resides in a mounting for an exhaust gas catalyst which prevents direct contact of the catalyst with the exhaust line, thereby protecting the catalyst against damage.

These and further objects, features, and advantages of the present invention will become more apparent from the following description when taken in connection with the accompanying drawing which shows, for purposes of illustration only, two embodiments in accordance with the present invention, and wherein.

Figure 1:
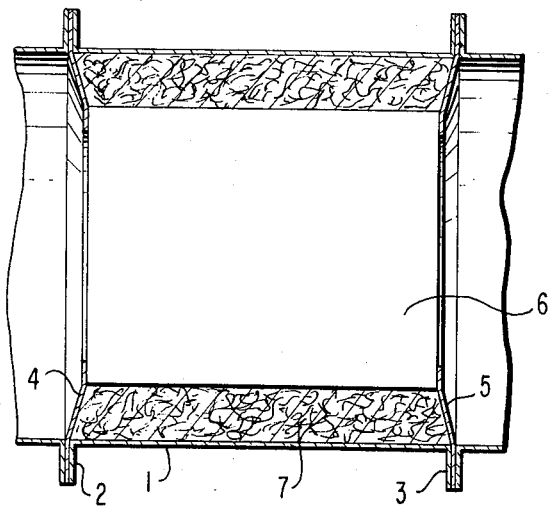
FIG. 1 is a schematic longitudinal cross-sectional view of a mounting together with the catalyst body in accordance with the present invention.

Referring now to the drawing wherein like reference numerals are used throughout the various views to designate like parts, and more particularly to FIG. 1, this figure illustrates a pipe section 1 installed into the exhaust line which is equipped on both sides with flanges 2 and 3 for the fastening of two ring-shaped members or means 4 and 5. The hollow space between the catalyst body 6 and the pipe section 1 is filled out with a uniformly thick layer of ceramic wool 7 which serves as radial elastic centering and support of the catalyst body 6 and prevents a contact thereof with the pipe section 1. As shown in the Figures, catalyst body 6 is shaped in the form of a right section of a cylinder.

Figure 2:
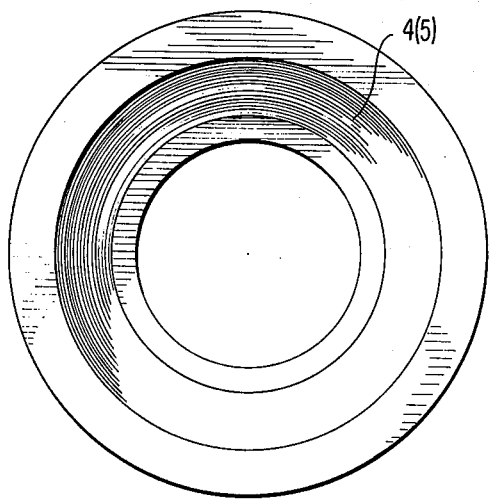
FIG. 2 is an end elevational view of the ring-shaped diaphragm in accordance with the present invention.

FIG. 2 illustrates the embodiment of the two ring-shaped members or means 4 and 5. As can be seen, their radially inwardly directed and outwardly directed annular flange portions are mutually offset in the axial direction by the presence of the corresponding inclined annular portion connecting the same, which is inclined with respect to a plane perpendicular to the longitudinal axis.

Figure 3:
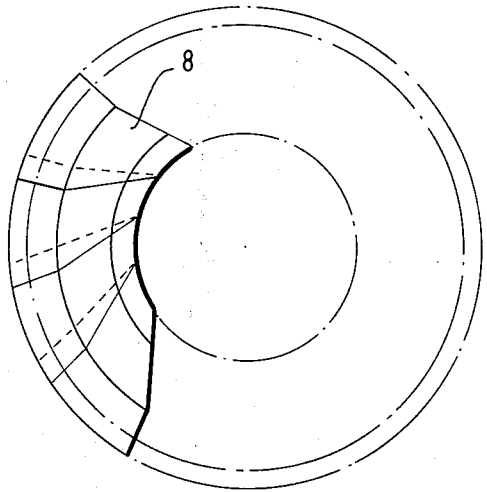
FIG. 3 is an end elevational view, similar to FIG. 2, of a modified embodiment of a diaphragm assembled of individual parts in accordance with the present invention.

FIG. 3 illustrates a further embodiment of a ring-shaped member which consists of individual members 8 that overlap mutually in a scale-shaped manner.

In conclusion, it should also be pointed out that the particular prestress is achieved by the shape of the members or means 4 and 5 which is necessary to order to clamp-in the catalyst body 6 elastically. This is achieved, as mentioned above, by the inclined surfaces of the members or means 4 and 5 providing the offset in such a manner that the radially inwardly directed flanges of the diaphragms 4 and 5 or of the diaphragms 8 are spaced closer to each other than the radially outwardly directed flanges thereof.

While I have shown and described two embodiments in accordance with the present invention, it is understood that the same is not limited thereto but is susceptible of numerous changes and modifications as known to those skilled in the art. For example, in lieu of ceramic wool, any other heat-resistant insulating material of known type may be used for the elastic support. Consequently, I do not wish to be limited to the details shown and described herein but intend to cover all of those modifications and changes as are encompassed by the scope of the appended claims.

What I claim is:

1. A catalytic converter for treating exhaust gas comprising:

an exhaust gas catalyst body having an inlet face and an outlet face arranged perpendicular to the flow direction of exhaust gas through said catalyst body, a pipe section containing said catalyst body, the ends of said pipe section respectively forming an exhaust gas inlet and an exhaust gas outlet, said catalyst body being spaced away from the inner wall of said pipe section so that said pipe section and said catalyst body define therebetween an annular space, a heat-resistant insulating material substantially filling said annular space thereby radially elastically supporting said catalyst body in said pipe section, and two prestressed ring-shaped members arranged laterally at the inlet face and the outlet face of said catalyst body, each prestressed ring-shaped member including a flat annular inner flange arranged perpendicular to said flow direction, the flat annular inner flange of one ring-shaped member engaging said inlet face and the flat annular inner flange of the other ring-shaped member engaging said outlet face, each ring-shaped member further including an inclined surface portion integral with the respective flat inner annular flange and mounted on said pipe section such that said two prestressed ring-shaped members elastically clamp said catalyst body therebetween thereby allowing limited axial movement of said catalyst body in said pipe section, at least one of said ring-shaped members being formed from a plurality of annulus sectors, each annulus sector including an inclined surface portion, an inner flange portion integral with said inclined surface portion and wherein said plurality of annulus sectors overlapping one another.

2. A catalystic converter for treating exhaust gas comprising:

an exhaust gas catalyst body having an inlet face and an outlet face arranged perpendicular to the flow direction of exhaust gas through said catalyst body, a pipe section containing said catalyst body, the ends of said pipe section respectively forming an exhaust gas inlet and an exhaust gas outlet, said catalyst body being spaced away from the inner wall of said pipe section so that said pipe section and said catalyst body define therebetween an annular space, the ends of said pipe section defining respective radially outwardly directed flanges, a heat-resistant insulating material substantially filling said annular space thereby radially elastically supporting said catalyst body in said pipe section, and two prestressed ring-shaped members arranged laterally at the inlet face and the outlet face of said catalyst body, each prestressed ring-shaped member including (a) a flat annular inner flange arranged perpendicular to said flow direction, (b) a radially outer flange arranged perpendicular to said flow direction and axially offset from said inner flange in such a manner that the inner flanges of the respective ring-shaped members are spaced closer to each other than the radially outer flanges, and (c) an inclined surface portion connecting the inner flange and radially outer flange of each ring-shaped member together, the radially outer flange of each ring-shaped member being mounted on the respective radially outwardly directed flange of said pipe section whereby said two prestressed ring-shaped members elastically clamp said catalyst body therebetween thereby allowing limited axial movement of said catalyst body in said pipe section, at least one of said ring-shaped members being formed from a plurality of annulus sectors, each annulus sector including an inclined surface portion, an inner flange portion integral with said inclined surface portion and an outer flange porton integral with said inclined surface portion, said plurality of annulus sectors overlapping one another.

3. An exhaust gas catalyst mounting for clamping a catalyst body having an inlet face and an outlet face in an exhaust line in such a way that said catalyst body is protected against exhaust gas oscillations and/or vehicle vibrations, said exhaust gas catalyst mounting comprising: a pipe section for containing said catalyst body, said pipe section defining an exhaust gas inlet and an exhaust gas outlet; a heat resistant insulating material substantially filling a space adjacent the inner wall of said pipe section, said insulating material being configured for radially elastically supporting a catalyst body in said pipe section; and two prestressed ring-shaped members arranged at the exhaust gas inlet and exhaust gas outlet respectively of said pipe section, said two prestressed ring-shaped members each defined by a flat inner annular flange portion for engaging the inlet face and outlet face respectively of said catalyst body and an inclined surface portion integral with said flange portion and mounted on said pipe section in such a way that said prestressed ring-shaped members are capable of elastically clamping said catalyst body therebetween thereby allowing limited axial movement of said catalyst body in said pipe section, at least one of said ring-shaped members being formed from a plurality of annulus sectors, each annulus sector including an inclined surface portion, an inner flange portion integral with said inclined surface portion and wherein said plurality of annulus sectors overlapping one another.

* * * * *